US012662798B2

(12) United States Patent
Strashny

(10) Patent No.: US 12,662,798 B2
(45) Date of Patent: Jun. 23, 2026

(54) APPARATUS FOR OPERATING A MACHINE WORK TOOL

(71) Applicant: Caterpillar Global Mining LLC, Tucson, AZ (US)

(72) Inventor: Igor Strashny, Tucson, AZ (US)

(73) Assignee: Caterpillar Global Mining LLC, Peoria, IL (US)

( * ) Notice: Subject to any disclaimer, the term of this patent is extended or adjusted under 35 U.S.C. 154(b) by 475 days.

(21) Appl. No.: 17/269,167

(22) PCT Filed: Aug. 23, 2019

(86) PCT No.: PCT/US2019/047914
§ 371 (c)(1),
(2) Date: Feb. 17, 2021

(87) PCT Pub. No.: WO2020/050995
PCT Pub. Date: Mar. 12, 2020

(65) Prior Publication Data

US 2021/0317635 A1 Oct. 14, 2021

(30) Foreign Application Priority Data

Sep. 3, 2018 (GB) ..................................... 1814273

(51) Int. Cl.

| | |
|---|---|
| ***E02F 9/22*** | (2006.01) |
| ***F15B 15/14*** | (2006.01) |
| *F15B 11/072* | (2006.01) |

(52) U.S. Cl.
CPC .......... *E02F 9/2217* (2013.01); *E02F 9/2271* (2013.01); *F15B 15/1447* (2013.01);
(Continued)

(58) Field of Classification Search
CPC ... E02F 9/2207; E02F 9/2217; F15B 15/1447; F15B 15/1466; F15B 2211/8855; F15B 11/072
See application file for complete search history.

(56) References Cited

U.S. PATENT DOCUMENTS 3,304,077 A * 2/1967 Eaton ........................ F16F 9/06
267/64.25
3,745,880 A * 7/1973 Metz ....................... F41A 25/20
89/43.01
(Continued)

FOREIGN PATENT DOCUMENTS

CN 103215979 B 4/2015
CN 104564908 A 4/2015
(Continued)

OTHER PUBLICATIONS

WO 2015022054 machine translation to English from espacenet (Year: 2015).*
(Continued)

*Primary Examiner* — Michael Quandt

(57) ABSTRACT

The present disclosure is directed towards apparatuses for operating a work tool of a machine. The apparatus comprises a cylinder and a piston comprising a piston head, the piston head being mounted in the cylinder such that the piston is moveable relative to the cylinder. The apparatus comprises a gas spring arrangement for biasing the piston head away from the first cylinder end. The gas spring arrangement comprises a first gas chamber and a second gas chamber having a variable volume based upon the position of the piston head in the cylinder. A gas connection arrangement fluidly connects the first gas chamber to the second gas chamber and is configured to enable gas to flow between the first and second gas chambers if the piston moves relative to
(Continued)

the cylinder. The disclosure is further directed towards methods of operating a machine comprising a work tool.

11 Claims, 6 Drawing Sheets

(52) U.S. Cl.
CPC ......... *F15B 15/1466* (2013.01); *F15B 11/072* (2013.01); *F15B 2211/8855* (2013.01)

(56) References Cited

U.S. PATENT DOCUMENTS

| | | | | |
|---|---|---|---|---|
| 4,016,630 | A * | 4/1977 | Bengtsson | B02C 2/047 241/207 |
| 4,674,638 | A * | 6/1987 | Oliphant | B66C 23/62 188/380 |
| 7,658,023 | B2 * | 2/2010 | Wallett | F16F 9/18 188/312 |
| 9,556,591 | B2 | 1/2017 | Shang et al. | |
| 9,593,465 | B2 | 3/2017 | Lavergne et al. | |
| 9,745,940 | B2 | 8/2017 | Morris et al. | |

FOREIGN PATENT DOCUMENTS

| | | | | |
|---|---|---|---|---|
| CN | 103244516 | B | 2/2016 | |
| DE | 19757460 | A1 * | 9/1998 | F16F 9/06 |
| DE | 102011109066 | A1 | 1/2013 | |
| GB | 2032883 | | 5/1980 | |
| GB | 2188698 | A | 10/1987 | |
| GB | 2407624 | A | 5/2005 | |
| WO | 2004113622 | A1 | 12/2004 | |
| WO | 2007033491 | A1 | 3/2007 | |
| WO | 2015022054 | A1 | 2/2015 | |
| WO | 2015185125 | A1 | 12/2015 | |

OTHER PUBLICATIONS

DE 19757460 A1 machine translation to English from espacenet (Year: 1998).*

International Search Report related to Application No. PCT/US2019/047914; reported on Dec. 5, 2019.

Great Britain Search Report related to Application No. 1814273.7; reported on Feb. 4, 2019.

* cited by examiner

APPARATUS FOR OPERATING A MACHINE WORK TOOL

CROSS-REFERENCE TO RELATED APPLICATION

This Application is a 35 USC § 371 US National Stage filing of International Application No. PCT/US2019/047914 filed on Aug. 23, 2019 which claims priority under the Paris Convention to Great Britain Patent Application No. 1814273.7 filed on Sep. 3, 2018.

TECHNICAL FIELD

This disclosure is directed towards apparatuses for operating a work tool of a machine. The disclosure is further directed towards methods of operating a machine comprising a work tool and an apparatus mounted to the work tool and a method of operating a gas spring arrangement.

BACKGROUND

Machines, including backhoe loaders, excavators, loaders and the like, commonly comprise a hydraulic control system for controlling one or more work tools, such as buckets, booms, backhoes, arms, grapples and the like. The hydraulic control system may comprise one or more actuators connected to each work tool and configured to move the work tool to perform work. The hydraulic control system comprises one or more pumps to move pressurised fluid into or through chambers of the actuators to cause the actuator to extend or retract. The pumps receive power from a power unit, such as an internal combustion engine, and the power they require may be relatively high. It may therefore be beneficial to reduce the power requirements to improve the efficiency of the machine and reduce emissions.

WO-A-2015/185125 discloses a material handling machine comprising a gas spring for balancing heavy loads to increase lifting capacity and/or to reduce energy consumption. The gas spring has a hollow piston rod carrying a piston inside a first diameter cylinder. A variable length first annular space is formed along the piston-rod between the piston and a first end cap. A second cylinder is arranged concentrically over the first cylinder. A second annular space is formed along the external periphery of the first cylinder. A cooling fluid is provided to the first annular space and the space including the second annular space and the hollow piston rod is arranged to contain pressurised gas. However, such an arrangement may require additional interfacing with cooling systems and the like and may have a high cost. In addition, the

SUMMARY

The present disclosure therefore provides an apparatus for operating a work tool of a machine, the apparatus comprising: a cylinder comprising a cylinder wall extending between first and second cylinder ends; a piston comprising a piston rod attached to a piston head, the piston head being mounted in the cylinder such that the piston is moveable relative to the cylinder; and a gas spring arrangement for biasing the piston head away from the first cylinder end, the gas spring arrangement comprising: a first gas chamber extending between the first cylinder end and piston head and a second gas chamber extending between piston head and second cylinder end, the first and second gas chambers having a variable volume based upon the position of the piston head in the cylinder; and a gas connection arrangement fluidly connecting the first gas chamber to the second gas chamber and configured to enable gas to flow between the first and second gas chambers if the piston moves relative to the cylinder.

The present disclosure further provides a method of operating a machine comprising a work tool and an apparatus mounted to the work tool, the apparatus comprising: a cylinder comprising a cylinder wall extending between first and second cylinder ends; a piston comprising a piston rod attached to a piston head, the piston head being mounted in the cylinder; and a gas spring arrangement comprising: a first gas chamber extending between the first cylinder end and piston head and a second gas chamber extending between piston head and second cylinder end; and a gas connection arrangement fluidly connecting the first gas chamber to the second gas chamber, wherein the method comprises: biasing the piston head away from the first cylinder end by a gas in the gas spring arrangement; moving the piston head such that first and second gas chambers vary in volume and gas is transmitted from the first gas chamber to the second gas chamber via the gas connection arrangement.

The present disclosure further provides a method of operating a gas spring arrangement, the gas spring arrangement being for operating a work tool of a machine and comprising first and second gas chambers inside a cylinder and fluidly connected by a gas connection arrangement, the gas connection arrangement comprising first and second gas valves, the method comprising: fluidly connecting at least one gas storage tank between the first and second gas valves; opening the first gas valve and closing the second gas valve; moving the piston head inside the cylinder to reduce the volume of the first gas chamber and drive gas from the first gas chamber through the open first gas valve and into the at least one gas storage tank; and fluidly disconnecting the at least one gas storage tank such that the pressure of the gas in the gas connection arrangement is reduced.

The present disclosure further provides an apparatus for operating a work tool of a machine, the apparatus comprising: a gas spring arrangement comprising at least one gas chamber formed by a piston head moveably mounted inside a cylinder, the at least one gas chamber being variable volume based upon the position of the piston head; and a gas storage apparatus comprising at least one gas storage tank having a fixed volume, wherein the at least one gas storage tank is fluidly connected by at least one gas storage conduit to the at least one gas chamber such that, if the piston head is moved to increase or reduce the volume of the at least one gas chamber, gas in the at least one gas chamber and at least one gas storage tank reduces or increases in pressure respectively.

The present disclosure further provides a method of operating a machine comprising a work tool and an apparatus mounted to the work tool, the apparatus comprising: a gas spring arrangement comprising at least one gas chamber formed by a piston head moveably mounted inside a cylinder; and a gas storage apparatus comprising at least one gas storage tank having a fixed volume, wherein the at least one gas storage tank is fluidly connected by at least one gas storage conduit to the at least one gas chamber, wherein the method comprises moving the piston head in the cylinder to reduce or increase the volume of the at least one gas chamber to increase or decrease respectively the pressure of gas in the at least one gas chamber and at least one gas storage tank.

BRIEF DESCRIPTION OF THE DRAWINGS

By way of example only, embodiments of apparatuses and methods of the present disclosure are now described with reference to, and as shown in, the accompanying drawings, in which.

DETAILED DESCRIPTION

The present disclosure is generally directed towards an apparatus for storing and recovering energy for operating a work tool of a machine, methods of operating such an apparatus and methods of operating gas spring arrangements. The apparatus comprises a gas spring arrangement that biases a piston to extend from a cylinder to provide a biasing force that can be used during operation of the work tool. The gas spring arrangement may recover energy using the gravitational down force of the weight of the work tool and release the energy during operation of the work tool to assist an actuator in moving the work tool. The apparatus may also comprise an actuator fluid system such that the apparatus is an integrated gas spring and actuator. The gas spring arrangement may be formed in the cylinder whilst the actuator fluid system may be formed in the piston and, as a result, the gas spring arrangement may generally be formed around the actuator fluid system.

Figure 1:
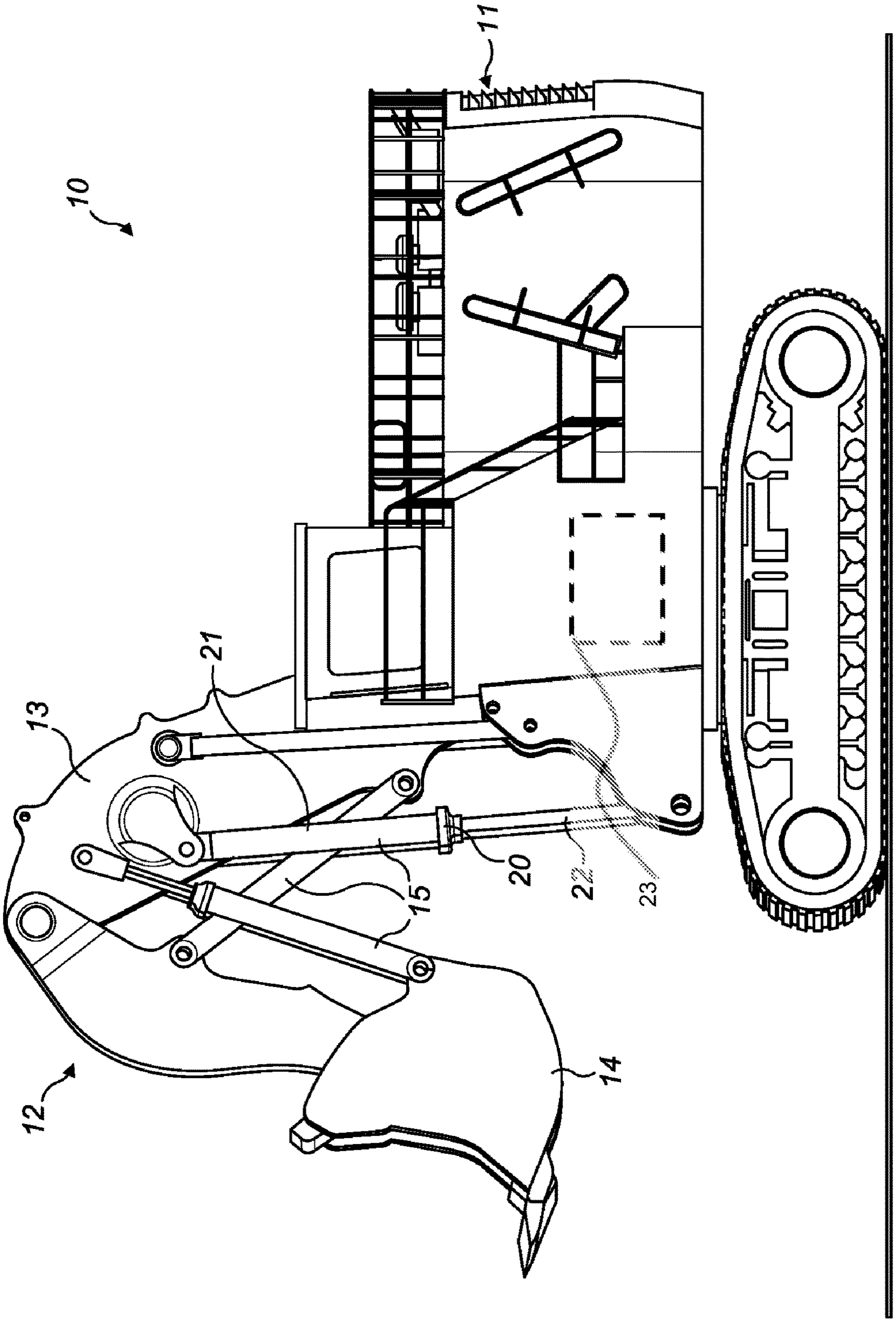
FIG. 1 is a side elevation of a machine comprising an embodiment of an apparatus of the present disclosure.

FIG. 1 illustrates a machine 10 of the present disclosure, which may comprise a main body 11 and a work tool 12 attached to the main body 11. The work tool 12 may comprise an arm arrangement 13 mounted to the main body 11 and an implement 14 attached to the arm arrangement 13 as illustrated. The work tool 12, particularly the arm arrangement 13, may be controlled by at least one actuator 15 to move the implement 14 and perform work. In the illustrated embodiment the machine 10 comprises an excavator, although the machine 10 may be any other type comprising at least one actuator 15, such as a truck (e.g. a dump truck), backhoe loader, another type of loader such as a wheel loader or track loader, dozer, shovel, material handler or telehandler.

The machine 10 further comprises an apparatus 20 of the present disclosure for storing energy for operating the work tool 12. The apparatus 20 may comprise and may be integrated with the at least one actuator 15. The machine 10 may comprise a plurality of apparatuses 20, such as by having a plurality of actuators 15 each integrated with an apparatus 20. The apparatus 20 is illustrated in further detail in FIGS. 2 and 3. The apparatus 20 comprises a cylinder 21 and a piston 22. The piston 22 may be at least partially sealed and slidably mounted within the cylinder 21 and they are moveable relative to one another between an extended configuration (FIGS. 1 and 2) and a retracted configuration (FIG. 3). The cylinder 21 and piston 22 may have a generally round cross-section.

The cylinder 21 comprises a cylinder wall 24 extending between first and second cylinder ends 25, 26 and may define a cylinder chamber 27 therebetween. The first and second cylinder ends 25, 26 may be formed by first and second cylinder end caps 28, 29, which may seal the cylinder wall 24 and cylinder chamber 27. The first cylinder end cap 28 may comprise a first mount 30 for mounting the cylinder 21 to the work tool 12 and/or main body 11.

The piston 22 comprises a piston rod 35 attached to a piston head 36 mounted and sealed in the cylinder chamber 27 and cylinder 21. The piston head 36 comprises first and second head surfaces 37, 38 and the second head surface 38 may have a lower surface area than that of the first head surface 37. The first head surface 37 may oppose and be located towards the first cylinder end 25 and the second head surface 38 may oppose and be located towards the second cylinder end 26. A piston head seal 39 may be mounted to and extend around the piston head 36, particularly its side, for forming a seal between the piston head 36 and cylinder 21. The second cylinder end 26 and second cylinder end cap 29 may comprise a rod passageway 40 in which the piston rod 35 is mounted and through which the piston rod 35 may slidably move. A piston rod seal 41 may extend around and be mounted to the rod passageway 40 for forming a seal between the piston rod 35 and cylinder 21. Lubricating oil 47 may be located inside the cylinder 21 adjacent to the piston rod seal 41 for providing lubrication and sealing. The piston rod 35 may comprise an outer piston end 42 at the opposite end of the piston rod 35 to the piston head 36.

The piston rod 35 may be hollow and may comprise a rod chamber 43 therein. The piston rod 35 may comprise a piston rod wall 44 extending and mounted between the piston head 36 and a piston end wall 45 to define the rod chamber 43 therebetween. The piston end wall 45, such as an end cap as shown, may seal the piston rod wall 44 at the outer piston end 42. The piston 22 may comprise a second mount 46 at the outer piston end 42, such as by being mounted on the piston end wall 45, for mounting the cylinder 21 to the work tool 12 and/or main body 11.

The apparatus 20 further comprises a gas spring arrangement 50 comprising first and second gas chambers 51, 52. The gas spring arrangement 50 is configured to store and release energy to assist in the operation of the work tool 12. The first gas chamber 51 extends between the first head surface 37, the first cylinder end 25 and the cylinder wall 24. The second gas chamber 52 extends from the second head surface 38 towards the second cylinder end 26 and may, as illustrated, extend between the piston rod 35 and the cylinder wall 24 when the piston rod 35 is thinner than the cylinder wall 24 and cylinder chamber 27. The first and second gas chambers 51, 52 are variable volume based upon the movement of the piston 22 relative to the cylinder 21 and particularly based upon the position of the piston head 36 within the cylinder chamber 27. Thus the first gas chamber 51 is configured to reduce in volume, and the second gas chamber 52 is configured to increase in volume, when the piston head 36 moves towards the first cylinder end 25 and vice-versa.

The gas spring arrangement 50 further comprises a gas connection arrangement 53 for fluidly connecting the first gas chamber 51 to the second gas chamber 52. The gas connection arrangement 53 is configured to enable gas to be transmitted between the first and second gas chambers 51, 52 when the piston 22 moves relative to the cylinder 21. The gas connection arrangement 53 may comprise at least one gas passageway 54 extending through the piston head 36. The at least one gas passageway 54 may extend between the first and second head surfaces 37, 38. The gas spring arrangement 50 may further comprise a pressurised gas, such a nitrogen, located within the first and second gas chambers 51, 52 and gas connection arrangement 53.

The apparatus 20 may comprise a secondary piston 60 mounted partially inside the piston 22 and mounted to the cylinder 21. In particular, the secondary piston 60 may comprise a secondary head 61 slidably mounted inside the rod chamber 43 of the piston rod 35 and may comprise a secondary rod 62 mounted to the secondary head 61. The secondary rod 62 may extend to and be attached to the first cylinder end 25. A secondary head seal 63 may extend around and be mounted to the secondary head 61, particularly its side, for forming a seal between the secondary head 61 and the piston 22, particularly the piston rod wall 44. The piston head 36 may comprise a secondary piston passageway 64 in which the secondary rod 62 may be slidably mounted. A secondary rod seal 65 may extend around and be mounted to the secondary piston passageway 64 for forming a seal between the secondary rod 62 and the piston head 36.

Therefore, the apparatus 20 may comprise first and second piston chambers 66, 67. The first piston chamber 66 may extend between the secondary head 61 and the second head surface 38 of the piston head 36 and the second piston chamber 67 may extend from the secondary head 61 towards the outer piston end 42. As the secondary rod 62 may be thinner than the piston rod 35, piston rod wall 44 and rod chamber 43, the first piston chamber 66 may also extend between the secondary rod 62 and piston rod wall 44. The second piston chamber 67 may also extend between the secondary head 61, outer piston end 42 and piston rod wall 44.

The apparatus 20 may comprise the actuator 15 by further comprising an actuator fluid system 70 for moving the piston 22 relative to the cylinder 21. The actuator fluid system 70 may comprise at least one fluid chamber 66, 67 inside the piston 22 and at least one pump 71 with a reservoir 76 for selectively supplying fluid via at least one actuator conduit 72, 74 to the at least one fluid chamber 66, 67 to move the piston 22 relative to the cylinder 21. The at least one fluid chamber 66, 67 may comprise the first and/or second piston chamber 66, 67. The at least one actuator conduit 72, 74 may comprise a first actuator conduit 72 extending from the first piston chamber 66 and it may extend through the piston rod wall 44, such as by forming an interspace between two sleeves forming the piston rod wall 44 as illustrated. The first actuator conduit 72 may extend from a first actuator port 73 in the outer piston end 42 (e.g. the piston end wall 45), through the piston rod wall 44, through the piston head 36 and into the first piston chamber 66 as illustrated. Alternatively, the first actuator port 73 may extend directly into the piston rod wall 44 and/or the first actuator conduit 72 may extend directly into the first piston chamber 66 from the piston rod wall 44 (not shown). The at least one actuator conduit 72, 74 may further comprise a second actuator conduit 74 extending from the second piston chamber 67 to a second actuator port 75 and the second actuator conduit 74 may be located inside the outer piston end 42 (e.g. the piston end wall 45 as illustrated).

The actuator fluid system 70 may comprise any other suitable components, such as valves, and may be a hydraulic fluid system such that the fluid is a hydraulic fluid. The actuator fluid system 70 may be controlled by a controller and the controller may receive instructions to move the work tool 12 from an input device, such as a joystick, operated by an operator in the main body 11. Therefore, by controlling the flow of fluid into the first and second piston chamber 66, 67 the actuator fluid system 70 may control the position of the piston head 36 within the cylinder 21 and, as a result, control the position of the work tool 12.

In the present disclosure the actuator fluid system 70 may be operable to apply force to the piston head 36 to extend and retract the piston 22 from the cylinder 21 and thereby operate the work tool 12, such as by varying the volume of fluid in the first and second piston chamber 66, 67. The power requirements of the actuator fluid system 70 may be relatively high due to the force required by the work tool 12 to perform work and the force required to overcome the gravitational down force acting on the cylinder 21 and piston 22 by virtue of the weight of the work tool 12. The gas spring arrangement 50 provides a spring force to supplement the force provided by the actuator fluid system 70 by virtue of pressurised gas in the first and second gas chambers 51, 52 acting against the first and second head surface 37, 38. Even though the pressure of the gas may be substantially the same in the first and second gas chambers 51, 52, since the first head surface 37 has a higher surface area than the second head surface 38 the force applied to the first head surface 37 is higher than the force applied to the second head surface 38. Hence the gas spring arrangement 50 applies a net spring force against the piston head 36 that biases the piston 22 away from the first cylinder end 25 to extend from the cylinder 21 (i.e. towards the extended configuration).

Figure 3:
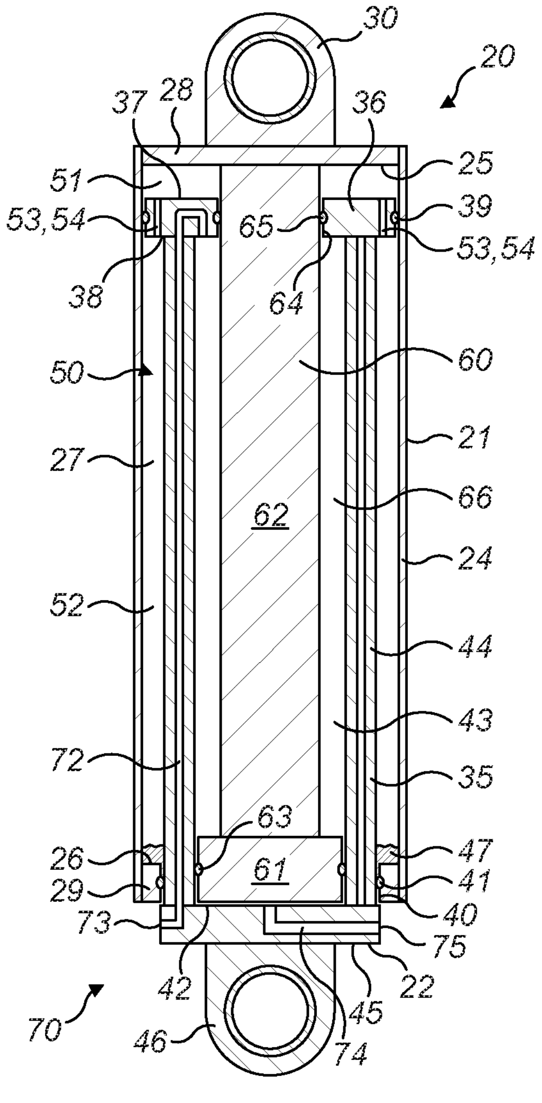
FIG. 3 is a schematic representation of the apparatus of FIGS. 1 and 2 in a retracted configuration.
Figure 4:
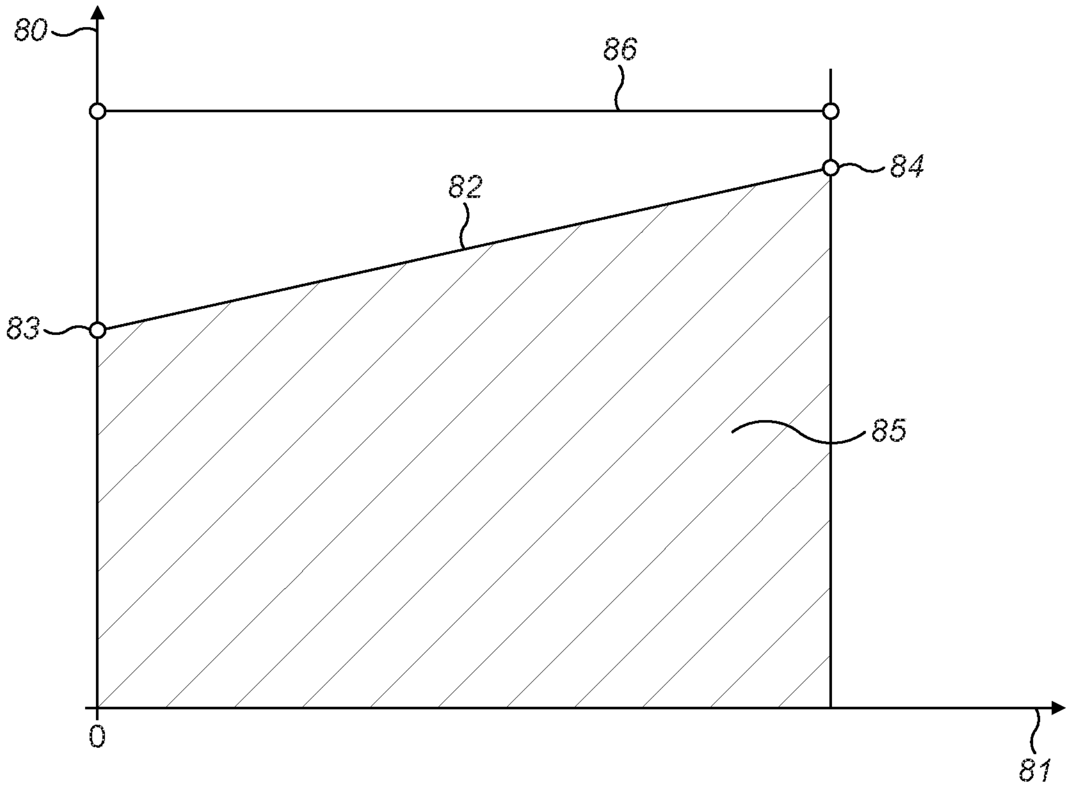
FIG. 4 is a graph showing force acting on the apparatus of FIGS. 1 to 3 against a cylinder displacement.

FIG. 4 is a graph showing force 80 on the y axis and cylinder displacement 81 on the x axis. The gas spring line 82 illustrates a spring force provided by the gas spring arrangement 50 that increases from an extended force 83 when the piston 22 is in the extended configuration (as in FIG. 2) to a retracted force 84 when the piston 22 is in the retracted configuration (as in FIG. 3). The gradient of the gas spring line 82 represents a spring constant of the gas spring arrangement 50. The extended force 83 may be a result of the first and second gas chambers 51, 52 being supplied with pressurised gas up to a pre-charge pressure whilst the piston 22 is in the extended configuration, such as by supplying pressurised gas into the first gas chamber 51 through a gas port (not shown) in the first cylinder end 25. The retracted force 84 may be higher than the extended force 83 because the pressure of the gas in the first and second gas chambers 51, 52 is higher at a retracted pressure when the piston 22 is in the retracted configuration. This may be a result of the volume of the first and second gas chambers 51, 52 being lower when the piston 22 is in the retracted configuration because the piston 22 occupies a higher volume of the cylinder chamber 27. Therefore, the gradient of the gas spring line 82 may also represent a compression ratio of the gas spring arrangement 50, which may be defined as the ratio of the retracted pressure to the pre-charge pressure. An area 85 under the gas spring line 82 may represent the energy storage capacity of the gas spring arrangement 50. A gravity force line 86 represents the gravitational down force acting on the cylinder 21 and piston 22 by virtue of the weight of the arm arrangement 13, which may be higher than the pre-charge and retracted pressures.

In operation the gas spring arrangement 50 may be charged by supplying gas to the first and second gas chambers 51, 52 up to the pre-charge pressure. In use, for example when a lowering of the arm arrangement 13 is required, the actuator fluid system 70 may allow the piston 22 to retract into the cylinder 21 under the gravitational down force of the work tool 12. As a result, the potential energy from the weight of the actuator fluid system 70 is recovered by storing it as increased pressure in the gas spring arrangement 50. The gravitational down force of the work tool 12 may be used to store energy, particularly when it is higher than the spring force of the gas spring arrangement 50 as in FIG. 4. The actuator fluid system 70 may also apply a force to retract the piston 22 in addition to the gravitational down force, further storing energy in the gas spring arrangement 50. Such an operation may be necessary if the gravitational down force is lower than the extended and retracted forces 83, 84. Subsequently, when an extension of the piston 22 is required, such as during a raising of the arm arrangement 13, the spring force of the gas spring arrangement 50 supplements the power from the actuator fluid system 70 to extend the piston 22 by releasing the stored energy.

Various other embodiments also fall within the scope of the present disclosure. For example, the second gas chamber 52 may comprise the first piston chamber 66 and extend from the second head surface 38 towards the second cylinder end 26 inside the piston 22. The at least one gas passageway 54 may extend between the first piston chamber 66 and the first gas chamber 51 (i.e. extend into the piston rod 35 rather than outside of it as in FIGS. 2 and 3). The at least one fluid chamber 66, 67 of the actuator fluid system 70 may, for example, only comprise the second piston chamber 67 and fluid may be supplied to or drawn from the second piston chamber 27 only to control the extension of the piston 22.

Figure 2:
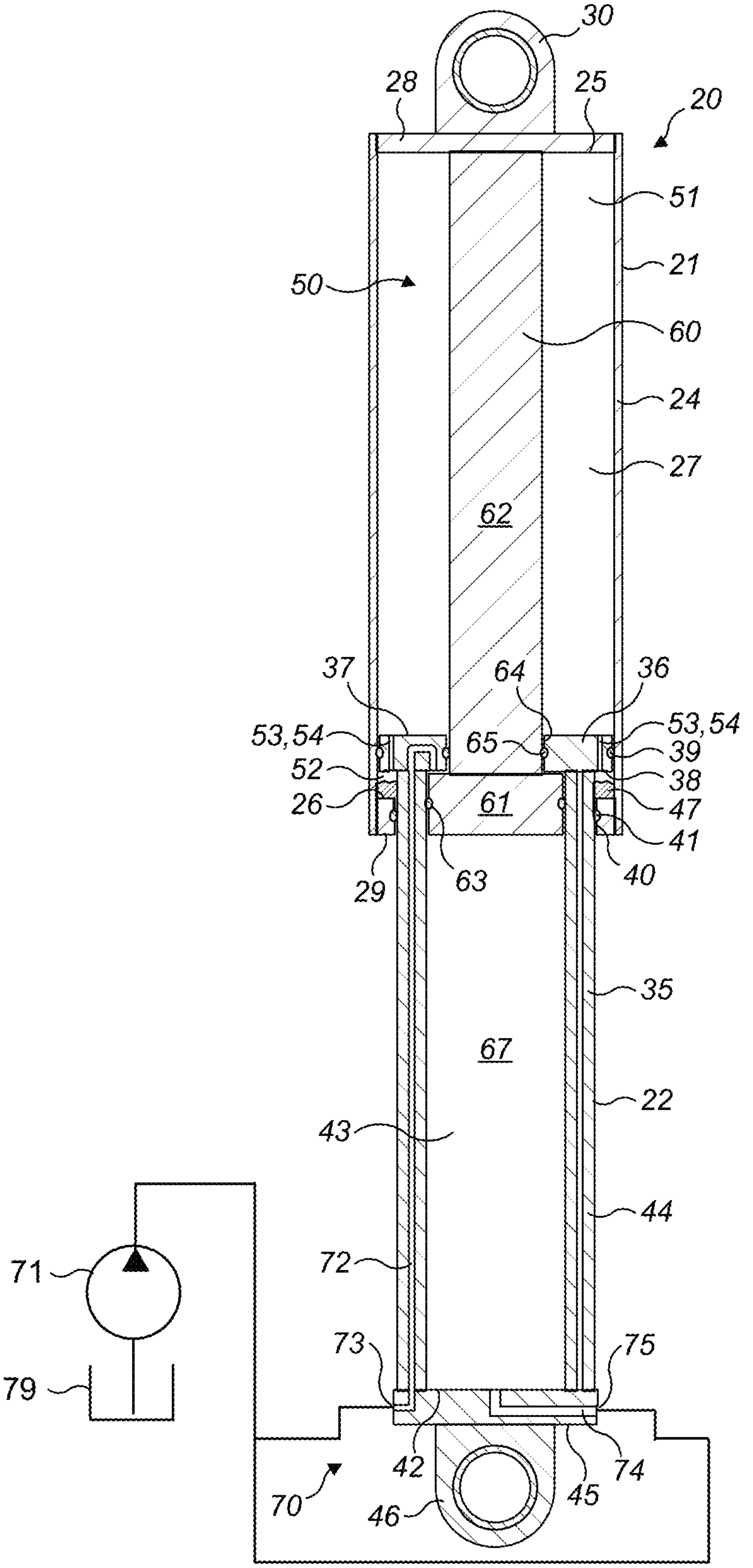
FIG. 2 is a schematic representation of the apparatus of FIG. 1 in an extended configuration.

Rather than the apparatus 20 comprising an integrated gas spring arrangement 50 and actuator 15 as in FIGS. 1 to 3 the apparatus 20 may instead be a separate gas spring (not shown) from the actuator(s) 15 of the machine 10. For example, the apparatus 20 may not comprise a hollow piston 22 or the actuator fluid system 70 as described above and instead may only comprise the gas spring arrangement 50. As a result, the apparatus 20 may separately store energy to the actuators 15. The machine 10 may comprise at least one actuator 15 mounted to the work tool 12 for operating the work tool 12 and at least one separate apparatus 20 mounted to the work tool 12 to store and release energy.

Figure 5:
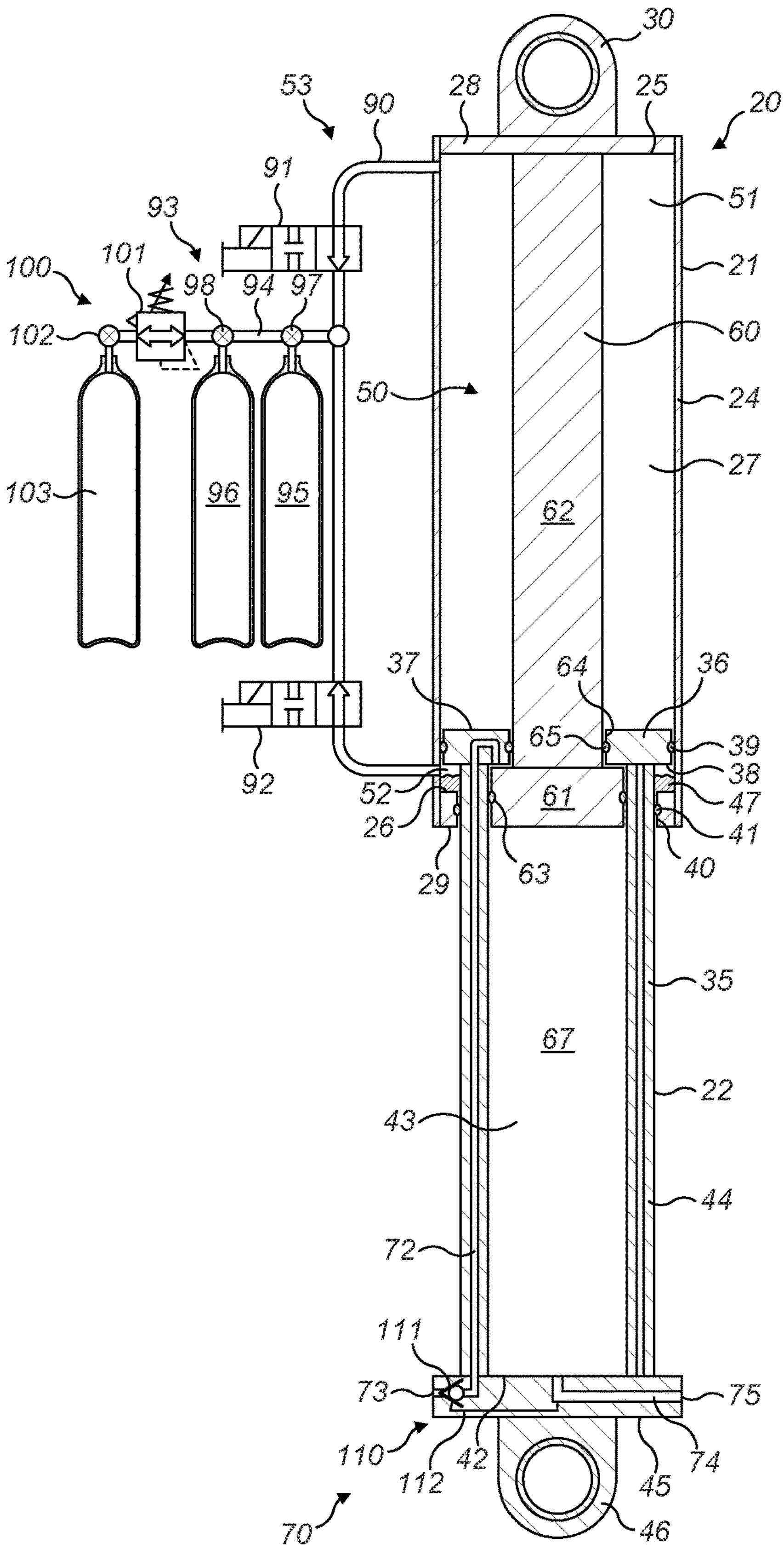
FIG. 5 is a schematic representation of a further embodiment of the apparatus of the present disclosure in an extended configuration.
Figure 6:
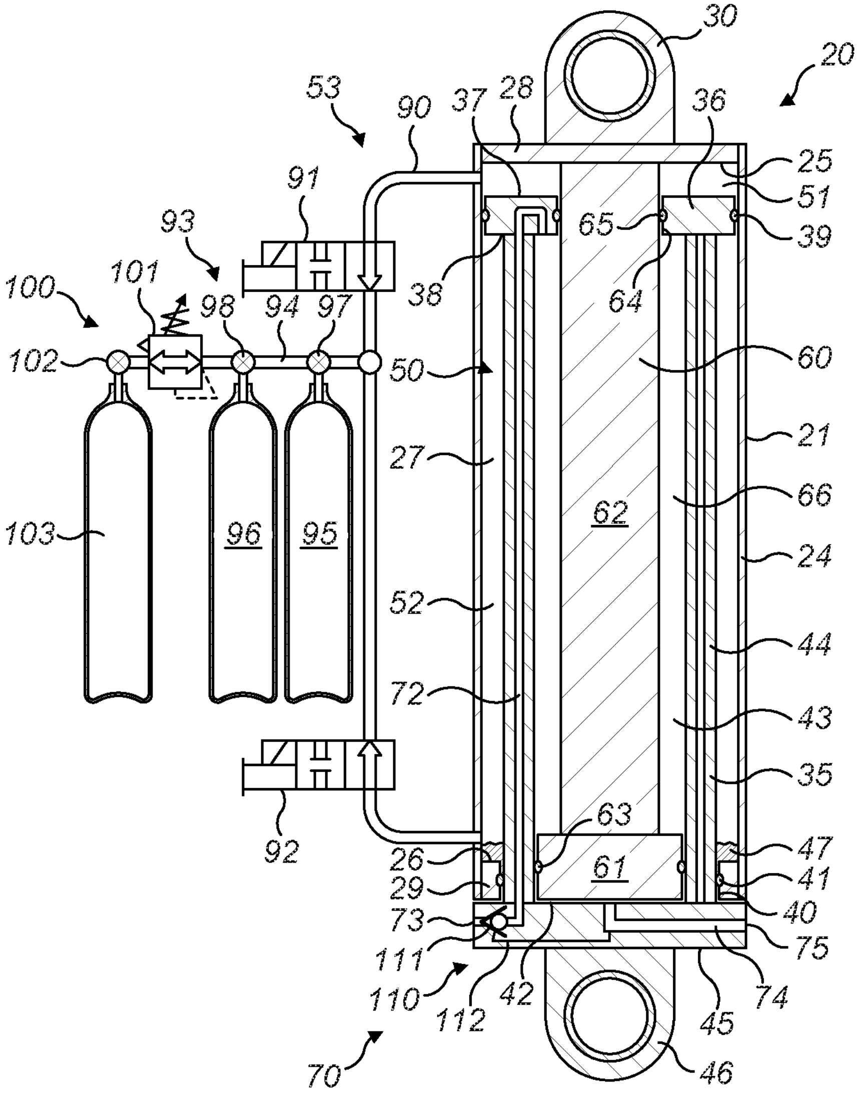
FIG. 6 is a schematic representation of the apparatus of FIG. 5 in a retracted configuration.

FIGS. 5 and 6 illustrate a further embodiment of the apparatus 20 of the present disclosure. The embodiment of FIGS. 5 and 6 has features in common with FIGS. 1 to 3 and the same reference numerals have been used to indicate similar features. In FIGS. 5 and 6 the gas connection arrangement 53 may comprise at least one gas conduit 90 extending around the piston head 36 rather than through it as in FIGS. 2 and 3. The at least one gas conduit 90 may extend from the first gas chamber 51 out of the cylinder 21 and to the second gas chamber 52. The at least one gas conduit 90 may extend through the cylinder wall 24 as illustrated or may extend through the first and/or second cylinder ends 25, 26. The at least one gas conduit 90 may comprise at least one pipe, hose or the like. The gas connection arrangement 53 may comprise at least one gas valve 91, 92, in this case first and second gas valves 91, 92, for controlling the flow of gas through the at least one gas conduit 90. The at least one gas valve 91, 92 may be configured to prevent the flow of gas to prevent substantial movement of the piston 22 in the cylinder 21 (i.e. other than due to compression of the gas).

The present disclosure further provides a gas storage apparatus 93 fluidly connected to at least one gas chamber 51, 52. In the illustrated embodiment the apparatus 20 of the present disclosure comprises the gas storage apparatus 93, which may be fluidly connected to the at least one gas conduit 90 of the gas connection arrangement 53 and may be connected between the first and second gas valve 91, 92. However, the gas storage apparatus 93 may be applied to any gas spring arrangement 50 for a machine 10 having at least one gas chamber 51, 52. The gas storage apparatus 93 may comprise at least one gas storage conduit 94 to which at least one gas storage tank 95, 96 (in this case two gas storage tanks 95, 96) is fluidly connected, such as by at least one gas storage adapter 97, 98. The at least one gas storage adapter 97, 98 may comprise valves or the like, a relief valve (such as a burst disc arrangement) and an adapter connector, such as screw threads, to which the at least one gas storage tank 95, 96 may be releasably attached. The at least one gas storage tank 95, 96 may have a fixed volume and may be in open fluid communication with the at least one gas chamber 51, 52 as the piston 22 moves relative to the cylinder 21 (e.g. the at least one gas valve 91, 92 may be open). The at least one gas storage tank 95, 96 may be a gas cylinder and/or pressure vessel configured to store gas at a relatively high pressure (i.e. at least at the pre-charge and retracted pressures) and may comprise a tank adapter, such as screw threads, for releasably attaching to an adapter connector. The at least one gas storage tank 95, 96 may increase the volume available for gas in the gas spring arrangement 50 and gas in the at least one gas chamber 51, 52 and at least one gas storage tank 95, 96 may increase and decrease in pressure together. In the apparatus 20, gas may therefore be present in the first and second gas chambers 51, 52, the at least one gas conduit 90, the at least one gas storage conduit 94 and the at least one gas storage tank 95, 96. As the gas volume is higher the compression ratio is reduced (i.e. the gradient of the gas spring line 82 is reduced) and thus the energy stored by the gas spring arrangement 50 is increased. As a result, the gas spring arrangement 50 can supply more energy to assist in powering the movement of the work tool 12.

The at least one gas storage tank 95, 96 may be mounted outside of and/or separated from the cylinder 21, such as by being mounted to outside of the cylinder 21, machine 10 and/or work tool 12. Preferably the at least one gas storage tank 95, 96 is a gas bottle or bottled gas, which are commercially and commonly available. The at least one gas storage tank 95, 906 may comprise a transportable gas storage tank that complies with a regional standard, such as ISO 24431:2016(en).

The apparatus 20 may further comprise a gas port apparatus 100 fluidly connected to the first and/or second gas chamber 51, 52 for charging and discharging the gas spring arrangement 50. The gas port apparatus 100 may comprise a gas port valve 101 for selectively controlling the flow of gas into the first and/or second gas chamber 51, 52 and may comprise at least one gas port adapter 102 for the mounting of a gas supply, such as at least one gas supply tank 103 as illustrated. The at least one gas supply tank 103 may be fixed volume and may be in a similar form to the at least one gas storage tank 95, 96. As in the illustrated embodiment the gas port apparatus 100 may be fluidly coupled to the gas storage apparatus 93, such as to the at least one gas storage conduit 94 and may therefore be fluidly connected to the first and second gas chamber 51, 52 by the at least one gas conduit 90. Alternatively, the gas port apparatus 100 may be fluidly coupled directly and mounted to the at least one gas conduit 90 and/or to the first and/or second gas chamber 51, 52. The gas port valve 101 may comprise a pressure regulator that enables gas to flow from the at least one gas supply tank 103 into the first and/or second gas chamber 51, 52 when the pressure therein reduces below the pre-charge pressure. As a result, the pressure of the gas spring arrangement 50 may be maintained at the pre-charge pressure when the full extension operation to the extended configuration is performed.

The present disclosure also provides a method of charging and discharging the gas spring arrangement 50, such as during maintenance, installation or uninstallation, using at least one of the tanks 95, 96, 103 of the storage and/or gas port apparatus 93, 100. During discharging one of the first and second gas valves 91, 92 may be closed whilst the other is opened. The gas port valve 101 may be opened if gas is to be discharged into the at least one gas supply tank 103 and the adapters 97, 98, 102 corresponding to the tank(s) 95, 96, 103 being used for discharging may be opened if they comprise valves. The piston 22 may then be moved relative to the cylinder 21 by the actuator fluid system 70 to direct gas from the first and second gas chambers 51, 52 into the tank(s) 95, 96, 103. If the first gas valve 91 is open the piston 22 may be moved from the extended configuration at least partially to the retracted configuration to drive gas from the first gas chamber 51 into the tank(s) 95, 96, 103. If the second gas valve 92 is open the piston 22 may be moved from the retracted configuration at least partially to the extended configuration to drive gas from the second gas chamber 52 into the tank(s) 95, 96, 103. The gas port valve 101 and/or the open first or second gas valve 91, 92 may subsequently closed and the tank(s) 95, 96, 103 is/are disconnected and removed, leaving the gas spring arrangement 50 at a low pressure to enable maintenance and servicing. The gas in the gas spring arrangement 50 may also be ventilated to the environment by opening the gas port valve 101, first gas valve 91, second gas valve 92 and/or the adapters 97, 98, 102 to remove any remaining pressurised gas such that the gas in the gas spring arrangement 50 reaches the ambient pressure. The apparatus 20 may comprises additional venting and/or relief valves to assist with such removal.

In order to charge the gas spring arrangement 50 one or both of the first and second gas valves 91, 92 may be opened. The gas port valve 101 may be opened if gas is to be charged from the at least one gas supply tank 103 and the adapters 97, 98, 102 corresponding to the tank(s) 95, 96, 103 being used for charging may be opened if they comprise valves. The tank(s) 95, 96, 103 may be connected to the corresponding adapter(s) 97, 98, 102, thereby releasing pressurised gas into the gas spring arrangement 50. The piston 22 may then be moved by the actuator fluid system 70 from the retracted to extended configurations or vice-versa, depending upon which of the first and second gas valves 91, 92 is open in a similar manner to discharging. The closed first or second gas valve 91, 92 may then be opened such that the gas spring arrangement 50 is operational.

FIGS. 5 and 6 also illustrate an embodiment of the actuator fluid system 70 further comprising a fluid lock arrangement 110 for locking movement of the piston 22 relative to the cylinder 21 when the piston 22 is biased to extend from the cylinder 21 by the gas spring arrangement 50. The fluid lock arrangement 110 may be configured to prevent the piston 22 from extending from the cylinder 21 unless the actuator fluid system 70 is controlled to extend the piston 22 from the cylinder 21. The fluid lock arrangement 110 may also be applied to the apparatus 20 of FIGS. 2 and 3.

The fluid lock arrangement 110 may comprise a check valve 111 located in the first actuator conduit 72 for controlling flow of fluid through the first actuator conduit 72 and first piston chamber 66. The check valve 111 may be located at the outer piston end 42 and may be mounted in the piston end wall 45, such as in the end cap as shown. The check valve 111 may enable fluid to flow substantially freely into the first piston chamber 66 from the first actuator conduit 72 from the first actuator port 73. The check valve 111 may prevent fluid from flowing out of the first piston chamber 66 and first actuator conduit 72 unless actuated to open. The check valve 111 may be actuated by a check valve pilot conduit 112 extending from the second actuator conduit 74 to the check valve 111 for opening the check valve 111 when the pressure in the second actuator conduit 74 reaches and/or is commanded to reach a preset lock pressure value. The preset lock pressure value may be a pressure of the fluid in the actuator fluid system 70 that is only achieved when the at least one pump 71, accumulator or the like is commanded to drive fluid into the second actuator conduit 74 and second piston chamber 67. Therefore, the check valve 111 may only be opened when pressure in the second actuator conduit 74 and second piston chamber 67 is commanded to rise such that the piston 22 extends relative to the cylinder 21. As a result, the check valve 111 provides a lock that ensures that the piston 22 does not undesirably extend under the biasing force of the gas spring arrangement 50, thereby improving operation and safety of the apparatus 20.

INDUSTRIAL APPLICABILITY

The spring force provided by the gas spring arrangement 50 may reduce the power required to operate the work tool 12. In particular, the actuator 15 may not have to overcome all of the gravitational down force of the work tool 12. If the gas spring arrangement 50 is configured (e.g. has gas at an appropriate pressure) to have a spring force that is less than the gravitational down force, as shown in FIG. 4, the actuator 15 need only supply the force between the gas spring line 82 and gravity force line 86. If the spring force is greater than the gravitational down force then the actuator 15 does not need to overcome the gravitational down force to operate the work tool 12. As a result, the pressure requirements of the fluid in the actuator fluid system 70 may be lower and the actuator fluid system 70 may be designed accordingly, such as by have at least one pump 71 and/or at least one power unit supplying power to the at least one pump 71 with a lower power rating than that required if there were no gas spring arrangement 50. The power density of the apparatus 20 is further improved where the actuator 15 is integrated with the gas spring arrangement 50.

By having the gas spring arrangement 50 in the cylinder 21 and mounted around the actuator fluid system 70 in the piston 22, the surface area against which the gas acts (i.e. the first and second head surfaces 37, 38) may be higher. The gas pressure for the same amount of energy stored may therefore be reduced. In addition, the use of the gas storage apparatus 93 may further reduce the compression ratio. The result of reducing the compression ratio may be that the energy capacity of the gas spring arrangement 50 may increase and the variation of the temperature of the gas in the gas spring arrangement 50 may be reduced between the pre-charge and retracted pressures. The gas spring arrangement 50 may therefore operate closer to isothermal rather than adiabatic, which results in improved round trip efficiency (i.e. the losses incurred during storage and recovery are reduced) and may mean that additional cooling systems and the like are not required.

The gas spring arrangement 50 may be a passive energy storage and recovery system and, as a result, may therefore not require a complex control system or substantial maintenance. Furthermore, by incorporating the fluid lock arrangement 110 a soft failure mode may be provided. In addition to using the method of charging and discharging, by having the gas spring arrangement 50 in the cylinder 21 and mounted around the actuator fluid system 70 in the piston 22 the servicing of the apparatus 20 may be simplified. Since a lower pre-charge pressure is required to provide the spring force, service technicians are not required to operate high gas pressure equipment and the complexity of maintenance work is further reduced.

Furthermore, the incorporation of the actuator fluid system 70 within the piston 22 results the only possibly exposed seal, piston rod seal 41 not being a critical seal of the actuator fluid system 70.

The invention claimed is:

1. An apparatus for operating a work tool of a machine, the apparatus comprising:

a cylinder comprising a cylinder wall extending between first and second cylinder ends;

a piston comprising a piston rod attached to a piston head, the piston head being mounted in the cylinder such that the piston is moveable relative to the cylinder;

a secondary rod extending from the first cylinder end and terminating with a secondary head, the secondary rod and the secondary head being within the cylinder and the piston;

an actuator fluid system for moving the piston relative to the cylinder, the actuator fluid system having at least one fluid chamber inside the piston and at least one fluid pump for selectively supplying fluid via at least one actuator conduit to the at least one fluid chamber to move the piston relative to the cylinder; and a gas spring arrangement for biasing the piston head away from the first cylinder end, the gas spring arrangement comprising:

a first gas chamber extending between the first cylinder end and the piston head and a second gas chamber extending between the piston head and the second cylinder end wherein the second gas chamber is outside of the piston and extends from the piston head towards the second cylinder end between the piston rod and cylinder wall, the first gas chamber and the second gas chamber each having a variable volume based upon the position of the piston head in the cylinder;

a gas connection arrangement fluidly connecting the first gas chamber to the second gas chamber and configured to enable gas to flow between the first gas chamber and the second gas chamber; and wherein the gas connection arrangement comprises at least one gas passageway extending through the piston head.

2. The apparatus as claimed in claim 1 wherein the piston head comprises first and second head surfaces, wherein the first head surface has a greater surface area than the second head surface such that a pressurized gas in the gas spring arrangement biases the piston head away from the first cylinder end.

3. The apparatus as claimed in claim 1, further comprising a secondary head mounted inside the piston rod forming a first piston chamber between the secondary head and piston head and a second piston chamber between the secondary head and an outer piston end of the piston rod, wherein the at least one fluid chamber comprises the first piston chamber and the second piston chamber, further wherein the at least one actuator conduit comprises a first actuator conduit extending from the first piston chamber and a second actuator conduit extending from the second piston chamber.

4. An apparatus for operating a work tool of a machine, the apparatus comprising:

a cylinder comprising a cylinder wall extending between first and second cylinder ends;

a piston comprising a piston rod attached to a piston head, the piston head being mounted in the cylinder such that the piston is moveable relative to the cylinder;

a secondary rod extending from the first cylinder end and terminating with a secondary head, the secondary rod and the secondary head being within the cylinder and the piston;

an actuator fluid system for moving the piston relative to the cylinder, the actuator fluid system having at least one fluid chamber inside the piston and at least one fluid pump for selectively supplying fluid via at least one actuator conduit to the at least one fluid chamber to move the piston relative to the cylinder; and a gas spring arrangement for biasing the piston head away from the first cylinder end, the gas spring arrangement comprising:

a first gas chamber extending between the first cylinder end and the piston head and a second gas chamber extending between the piston head and the second cylinder end wherein the second gas chamber is outside of the piston and extends from the piston head towards the second cylinder end between the piston rod and cylinder wall, the first gas chamber and the second gas chamber each having a variable volume based upon the position of the piston head in the cylinder; and a gas connection arrangement fluidly connecting the first gas chamber to the second gas chamber and configured to enable gas to flow between the first gas chamber and the second gas chamber; and a secondary head mounted inside the piston rod to form a first piston chamber between the secondary head and piston head and a second piston chamber between the secondary head and an outer piston end of the piston rod.

5. The apparatus as claimed in claim 4, wherein the at least one actuator conduit comprises a first actuator conduit extending from the first piston chamber and a second actuator conduit extending from the second piston chamber:

a fluid lock arrangement comprising a check valve located in the first actuator conduit and a check valve pilot conduit extending from the second actuator conduit to the check valve for opening the check valve if the pressure in the first actuator conduit reaches a preset lock pressure value.

6. The apparatus as claimed in claim 4 wherein the gas connection arrangement comprises at least one gas conduit extending between the first and second gas chambers and around the piston head.

7. The apparatus as claimed in claim 4 further comprising a gas storage apparatus comprising at least one gas storage tank having a fixed volume and fluidly connected to at least one of the first gas chamber and the second gas chamber, wherein the gas spring arrangement is configured to enable open fluid communication between the at least one gas storage tank and the at least one of the first gas chamber and the second gas chamber.

8. The apparatus as claimed in claim 4 further comprising a gas port apparatus fluidly connected to at least one of the first gas chamber and the second gas chamber, the gas port apparatus comprising a gas port valve for selectively controlling the flow of gas into the at least one of the first gas chamber and the second gas chamber and at least one adapter for mounting at least one gas supply tank.

9. A method of operating a machine comprising a work tool and an apparatus mounted to the work tool, the apparatus comprising:

a cylinder comprising a cylinder wall extending between first and second cylinder ends;

a piston comprising a piston rod attached to a piston head, the piston head being mounted in the cylinder;

a secondary rod extending from the first cylinder end and terminating with a secondary head, the secondary rod and the secondary head being within the cylinder and the piston;

an actuator fluid system for moving the piston relative to the cylinder having at least one fluid chamber inside the piston and at least one fluid pump for selectively supplying fluid via at least one actuator conduit to the at least one fluid chamber to move the piston relative to the cylinder; and a gas spring arrangement comprising:

a first gas chamber extending between the first cylinder end and the piston head and a second gas chamber extending between the piston head and the second cylinder end, wherein the second gas chamber is outside of the piston and extends from the piston head towards the second cylinder end between the piston rod and cylinder wall; and a gas connection arrangement fluidly connecting the first gas chamber to the second gas chamber, wherein the method comprises:

biasing the piston head away from the first cylinder end by a gas in the gas spring arrangement; and moving the piston head such that the first gas chamber and the second gas chamber vary in volume and gas is transmitted from the first gas chamber to the second gas chamber via the gas connection arrangement, the gas connection arrangement comprising at least one gas passageway extending through the piston head.

10. The method as claimed in claim 9 comprising moving the piston head towards the first cylinder end by applying a force to the piston and/or cylinder, the force comprising a gravitational down force of the work tool and/or a force applied by an actuator, such that the pressure of the gas increases.

11. The method as claimed in claim 9 further comprising moving the piston head towards the second cylinder end by applying a force to the piston, the force being at least partially applied to the piston head by gas in the first gas chamber.

* * * * *